(12) United States Patent
Montekyo et al.

(10) Patent No.: US 8,351,552 B2
(45) Date of Patent: Jan. 8, 2013

(54) DECODING OF FORWARD ERROR CORRECTION CODES IN THE PRESENCE OF PHASE NOISE AND THERMAL NOISE

(75) Inventors: Zohar Montekyo, MP Hanegev (IL); Ronen Yonesi, Netanya (IL); Jonathan Friedmann, Tel Aviv (IL)

(73) Assignee: Provigent Ltd., Herzlia (IL)

( * ) Notice: Subject to any disclaimer, the term of this patent is extended or adjusted under 35 U.S.C. 154(b) by 0 days.

(21) Appl. No.: 13/274,742

(22) Filed: Oct. 17, 2011

(65) Prior Publication Data

US 2012/0093265 A1    Apr. 19, 2012

Related U.S. Application Data

(63) Continuation of application No. 11/973,464, filed on Oct. 9, 2007, now Pat. No. 8,040,985.

(51) Int. Cl.
*H03D 1/04* (2006.01)
(52) U.S. Cl. ....................... 375/346
(58) Field of Classification Search .............. 375/346, 375/326, 316, 350, 341, 340; 714/752, 800
See application file for complete search history.

(56) References Cited

U.S. PATENT DOCUMENTS

| | | | |
|---|---|---|---|
| 4,288,658 A | 9/1981 | Bieber et al. | |
| 4,291,196 A | 9/1981 | Spaniol et al. | |
| 4,292,465 A | 9/1981 | Wilson et al. | |
| 4,310,813 A | 1/1982 | Yuuki et al. | |
| 4,321,705 A | 3/1982 | Namiki | |
| 4,367,555 A | 1/1983 | Namiki et al. | |
| 4,397,022 A | 8/1983 | Weng et al. | |
| 4,438,530 A | 3/1984 | Steinberger | |
| 4,479,258 A | 10/1984 | Namiki | |
| 4,557,330 A | 12/1985 | Fussell et al. | |

(Continued)

FOREIGN PATENT DOCUMENTS

EP    0454249    10/1991

(Continued)

OTHER PUBLICATIONS

American National Standard T1, 105-2001, "Synchronous Optical Network (SONET)—basic description including multiplex structure, rates and format," Alliance for Telecommunications Industry Solutions, 2001.

(Continued)

*Primary Examiner* — Jaison Joseph
(74) *Attorney, Agent, or Firm* — Sterne, Kessler, Goldstein, & Fox P.L.L.C.

(57) ABSTRACT

A communication receiver includes a front end, which is arranged to receive a Radio Frequency (RF) signal, which includes modulated symbols carrying data that have been encoded by a block Forward Error Correction (FEC) code. The front end converts the RF signal to a sequence of soft received symbols, wherein the soft received symbols are subject to distortion by at least first and second noise components having respective at least first and second statistical distributions. A metric calculation unit is arranged to process the soft received symbols so as to extract parameters indicative of the at least first and second statistical distributions, and to compute FEC metrics based on the extracted parameters. A FEC decoder is arranged to accept the FEC metrics as input, and to process the metrics in an iterative FEC decoding process so as to decode the FEC code and reconstruct the data.

28 Claims, 3 Drawing Sheets

U.S. PATENT DOCUMENTS

| | | |
|---|---|---|
| 4,575,862 A | 3/1986 | Tahara et al. |
| 4,606,054 A | 8/1986 | Amitay et al. |
| 4,627,045 A | 12/1986 | Olson et al. |
| 4,631,734 A | 12/1986 | Foschini |
| 4,644,562 A | 2/1987 | Kavehrad et al. |
| 4,688,235 A | 8/1987 | Tahara et al. |
| 4,761,784 A | 8/1988 | Srinivasagopalan et al. |
| 4,857,858 A | 8/1989 | Tahara |
| 4,910,468 A | 3/1990 | Ohtsuka et al. |
| 4,914,676 A | 4/1990 | Iwamatsu et al. |
| 4,992,798 A | 2/1991 | Nozue et al. |
| 4,995,040 A | 2/1991 | Best et al. |
| 5,068,667 A | 11/1991 | Mizoguchi |
| 5,075,697 A | 12/1991 | Koizumi et al. |
| 5,237,318 A | 8/1993 | Auclair et al. |
| 5,241,320 A | 8/1993 | Mizoguchi |
| 5,247,541 A | 9/1993 | Nakai |
| 5,268,685 A | 12/1993 | Fujiwara |
| 5,311,545 A | 5/1994 | Critchlow |
| 5,311,546 A | 5/1994 | Paik et al. |
| 5,313,467 A | 5/1994 | Varghese et al. |
| 5,383,224 A | 1/1995 | Mizoguchi |
| 5,406,589 A | 4/1995 | Iwamatsu et al. |
| 5,432,522 A | 7/1995 | Kurokami |
| 5,471,508 A | 11/1995 | Koslov |
| 5,495,502 A | 2/1996 | Andersen |
| 5,506,956 A | 4/1996 | Cohen |
| 5,524,027 A | 6/1996 | Huisken |
| 5,541,951 A | 7/1996 | Juhasz et al. |
| 5,541,955 A | 7/1996 | Jacobsmeyer |
| 5,614,914 A | 3/1997 | Bolgiano et al. |
| 5,631,896 A | 5/1997 | Kawase et al. |
| 5,663,990 A | 9/1997 | Bolgiano et al. |
| 5,684,810 A | 11/1997 | Nakamura et al. |
| 5,694,438 A | 12/1997 | Wang et al. |
| 5,710,799 A | 1/1998 | Kobayashi |
| 5,727,032 A | 3/1998 | Jamal et al. |
| 5,742,640 A | 4/1998 | Haoui et al. |
| 5,742,646 A | 4/1998 | Woolley et al. |
| 5,809,070 A | 9/1998 | Krishnan et al. |
| 5,838,224 A | 11/1998 | Andrews |
| 5,838,740 A | 11/1998 | Kallman et al. |
| 5,844,950 A | 12/1998 | Aono et al. |
| 5,862,186 A | 1/1999 | Kumar |
| 5,901,343 A | 5/1999 | Lange |
| 5,905,574 A | 5/1999 | Vollbrecht et al. |
| 5,920,595 A | 7/1999 | Iwamatsu |
| 5,940,453 A | 8/1999 | Golden |
| 5,987,060 A | 11/1999 | Grenon et al. |
| 6,215,827 B1 | 4/2001 | Balachandran et al. |
| 6,236,263 B1 | 5/2001 | Iwamatsu |
| 6,252,912 B1 | 6/2001 | Salinger |
| 6,262,994 B1 | 7/2001 | Dirschedl et al. |
| 6,307,505 B1 | 10/2001 | Green |
| 6,366,568 B1 | 4/2002 | Bolgiano et al. |
| 6,418,164 B1 | 7/2002 | Endres et al. |
| 6,452,964 B1 | 9/2002 | Yoshida |
| 6,466,562 B1 | 10/2002 | Yoshida et al. |
| 6,476,643 B2 | 11/2002 | Hugues et al. |
| 6,490,243 B1 | 12/2002 | Tanaka et al. |
| 6,501,953 B1 | 12/2002 | Braun et al. |
| 6,611,942 B1 | 8/2003 | Battistello et al. |
| 6,628,707 B2 | 9/2003 | Rafie et al. |
| 6,647,059 B1 | 11/2003 | Faruque |
| 6,665,810 B1 | 12/2003 | Sakai |
| 6,678,259 B1 | 1/2004 | Schwengler |
| 6,735,168 B1 | 5/2004 | Schnell et al. |
| 6,763,374 B1 | 7/2004 | Levi et al. |
| 6,826,238 B2 | 11/2004 | Ahn |
| 6,829,298 B1 | 12/2004 | Abe et al. |
| 6,836,515 B1 | 12/2004 | Kay et al. |
| 6,836,791 B1 | 12/2004 | Levi et al. |
| 6,842,444 B2 | 1/2005 | Bolgiano et al. |
| 6,888,794 B1 | 5/2005 | Jovanovic et al. |
| 6,915,463 B2 | 7/2005 | Vieregge et al. |
| 6,920,189 B1 | 7/2005 | Spalink |
| 6,954,504 B2 | 10/2005 | Tiedemann, Jr. et al. |
| 6,993,024 B1 | 1/2006 | McDermott, III et al. |
| 7,003,042 B2 | 2/2006 | Morelos-Zaragoza et al. |
| 7,016,296 B2 | 3/2006 | Hartman, Jr. |
| 7,046,753 B2 | 5/2006 | Resheff et al. |
| 7,047,029 B1 | 5/2006 | Godwin et al. |
| 7,127,669 B2 | 10/2006 | Platenberg et al. |
| 7,133,425 B2 | 11/2006 | McClellan |
| 7,133,441 B1 | 11/2006 | Barlev et al. |
| 7,187,719 B2 | 3/2007 | Zhang |
| 7,200,188 B2 | 4/2007 | Fague et al. |
| 7,254,190 B2 | 8/2007 | Kwentus et al. |
| 7,260,361 B2 | 8/2007 | Jacobsen |
| 7,296,063 B2 | 11/2007 | Levi et al. |
| 7,333,556 B2 | 2/2008 | Maltsev et al. |
| 7,366,091 B1 | 4/2008 | Lahti et al. |
| 7,415,548 B2 | 8/2008 | Mahany et al. |
| 7,418,240 B2 | 8/2008 | Hsu et al. |
| 7,460,583 B2 | 12/2008 | Khayrallah et al. |
| 7,463,867 B2 | 12/2008 | Luo et al. |
| 7,492,701 B2 | 2/2009 | Song et al. |
| 7,630,509 B2 | 12/2009 | Zarrabizadeh |
| 7,646,881 B2 | 1/2010 | Zarrabizadeh |
| 7,653,055 B2 | 1/2010 | Guo et al. |
| 7,770,097 B2 | 8/2010 | Platenberg et al. |
| 7,839,952 B2 | 11/2010 | Sofer et al. |
| 2001/0017897 A1 | 8/2001 | Ahn |
| 2002/0016933 A1 | 2/2002 | Smith et al. |
| 2002/0051498 A1* | 5/2002 | Thomas et al. ............... 375/262 |
| 2002/0061752 A1 | 5/2002 | Kurokami |
| 2002/0161851 A1 | 10/2002 | Chang |
| 2002/0181490 A1 | 12/2002 | Frannhagen et al. |
| 2003/0021370 A1 | 1/2003 | Menkhoff |
| 2003/0043778 A1 | 3/2003 | Luschi et al. |
| 2003/0045307 A1 | 3/2003 | Arviv et al. |
| 2003/0056158 A1 | 3/2003 | Yue |
| 2003/0066082 A1 | 4/2003 | Kliger et al. |
| 2003/0118133 A1* | 6/2003 | Lauer ............................ 375/344 |
| 2003/0135532 A1* | 7/2003 | Peting ........................... 708/622 |
| 2003/0185319 A1* | 10/2003 | Kolze ............................ 375/347 |
| 2003/0203721 A1 | 10/2003 | Berezdivin et al. |
| 2004/0017860 A1 | 1/2004 | Liu |
| 2004/0063416 A1 | 4/2004 | Kuenen et al. |
| 2004/0076240 A1* | 4/2004 | Wang et al. ................... 375/279 |
| 2004/0081081 A1 | 4/2004 | Colombo |
| 2004/0086668 A1 | 5/2004 | Dronzek |
| 2004/0151108 A1 | 8/2004 | Blasco Claret et al. |
| 2004/0198296 A1* | 10/2004 | Hui et al. ...................... 455/296 |
| 2004/0217179 A1 | 11/2004 | Garner |
| 2005/0002474 A1 | 1/2005 | Limberg |
| 2005/0010853 A1 | 1/2005 | Duvant et al. |
| 2005/0063496 A1 | 3/2005 | Guillouard et al. |
| 2005/0075078 A1 | 4/2005 | Makinen et al. |
| 2005/0111603 A1* | 5/2005 | Ginesi et al. ................. 375/362 |
| 2005/0123073 A1* | 6/2005 | Ginesi et al. ................. 375/326 |
| 2005/0149844 A1* | 7/2005 | Tran et al. ..................... 714/800 |
| 2005/0169401 A1 | 8/2005 | Abraham et al. |
| 2005/0190868 A1* | 9/2005 | Khandekar et al. .......... 375/346 |
| 2005/0239532 A1 | 10/2005 | Lai |
| 2005/0265436 A1 | 12/2005 | Suh et al. |
| 2005/0286618 A1 | 12/2005 | Abe |
| 2006/0008018 A1 | 1/2006 | Kolze |
| 2006/0013181 A1 | 1/2006 | Stolpman et al. |
| 2006/0056554 A1 | 3/2006 | Lin et al. |
| 2006/0093058 A1 | 5/2006 | Skraparlis |
| 2006/0107179 A1 | 5/2006 | Shen et al. |
| 2006/0193400 A1* | 8/2006 | Morris et al. ................. 375/316 |
| 2006/0203943 A1* | 9/2006 | Scheim et al. ................ 375/341 |
| 2006/0209939 A1 | 9/2006 | Mantha |
| 2007/0076719 A1 | 4/2007 | Allan et al. |
| 2007/0116143 A1 | 5/2007 | Bjerke et al. |
| 2007/0116162 A1 | 5/2007 | Eliaz et al. |
| 2007/0133397 A1 | 6/2007 | Bianchi et al. |
| 2007/0153726 A1 | 7/2007 | Bar-Sade et al. |
| 2007/0177565 A1 | 8/2007 | Lee |
| 2007/0230641 A1* | 10/2007 | Yehudai ........................ 375/350 |
| 2008/0002581 A1 | 1/2008 | Gorsetman et al. |
| 2008/0008257 A1 | 1/2008 | Yonesi et al. |
| 2008/0037675 A1* | 2/2008 | Lin et al. ....................... 375/262 |
| 2008/0043829 A1 | 2/2008 | Shiue et al. |
| 2008/0080634 A1 | 4/2008 | Kotecha et al. |

| | | | |
|---|---|---|---|
| 2008/0130616 | A1 | 6/2008 | Wengerter et al. |
| 2008/0130726 | A1 | 6/2008 | Sofer et al. |
| 2008/0137779 | A1* | 6/2008 | Valadon ............... 375/340 |
| 2008/0155373 | A1* | 6/2008 | Friedman et al. ........ 714/752 |
| 2008/0254749 | A1 | 10/2008 | Ashkenazi et al. |
| 2008/0259901 | A1 | 10/2008 | Friedman et al. |
| 2009/0022239 | A1 | 1/2009 | Kimura et al. |
| 2009/0049361 | A1 | 2/2009 | Koren et al. |

FOREIGN PATENT DOCUMENTS

| | | |
|---|---|---|
| EP | 1365519 | 11/2003 |
| JP | 6021762 | 1/1994 |
| JP | 2000115244 | 4/2000 |
| JP | 0161187 | 3/2001 |
| JP | 2001-217761 | 8/2001 |
| JP | 2002-9861 | 1/2002 |
| JP | 2002345023 | 11/2002 |
| JP | 2003068228 | 3/2003 |
| JP | 2004179821 | 6/2004 |
| JP | 2004179893 | 6/2004 |
| JP | 2005269530 | 9/2005 |
| JP | 2005333473 | 12/2005 |
| JP | 9064791 | 3/2007 |
| JP | 2007250050 | 9/2007 |
| JP | 2008033069 | 2/2008 |
| WO | WO 0060802 | 10/2000 |
| WO | WO 0076114 | 12/2000 |
| WO | WO 0077952 | 12/2000 |
| WO | WO 0154339 | 7/2001 |
| WO | WO 2004086668 | 10/2004 |
| WO | WO2004086668 | 10/2004 |
| WO | WO 2005122414 | 12/2005 |
| WO | WO 2006118892 | 11/2006 |
| WO | WO 2007040906 | 4/2007 |

OTHER PUBLICATIONS

Benani, et al., "Comparison of Carrier Recovery Techniques in M-QAM Digital Communications Systems," Proceedings of 13$^{th}$ Annual Canadian Conference on Electrical and Computer Engineering, pp. 73-77, Halifax, Canada, Mar. 7-10, 2000.
Best, R., "Phase Locked Loops: Design, Simulation, and Applications," McGraw Hill Professional, 5$^{th}$ Edition, pp. 81-92, Jun. 20, 2003.
A.R. Calderbank, "Multilevel Codes and Multistage Decoding," IEEE Transactions on Communications, vol. 37, No. 3, Mar. 1989.
G. Colavlope, el al., "Algorithms for iterative decoding in the presence of strong phase noise," IEEE Journal on Selected Areas in Communications, (23:9), Sep. 2005, pp. 1748-1757.
Diaz et al., "The Use of Coding and Diversity Combining for Miigating Fading Effects in a DS/CDMA System," IEEE Transactions and Vehicular Technology, vol. 47, No. 1, pp. 95-102, Feb. 1, 1998.
Duel-Hallen, et al., "Long Range Prediction of Fading Signals: Enabling Adaptive Transmission for Mobile Radio Channels," IEEE Signal Processing Magazine, vol. 17, No. 3, pp. 62-75, May 2000.
Ericsson AB, "Capacity without ties; Mini-Link microwave transmission solution," EN/LZT 712 0117 R2, Molndal, Sweden, 2005.
Gagnon, et al., "A Simple and Fast Carrier Recovery Algorithm for High-Order QAM," IEEE Communications Letters, vol. 9, No. 10, pp. 918-920, Oct. 2005.
Gallager, "Low-Density Parity-Check Codes," IRE Transactions o Information Theory, vol. 7, Jan. 1962, pp. 21-28.
Goeckel, D., "Adaptive Coding for Time-Varying Channels Using Outdated Fading Estimates," IEEE Transactions on Communications, vol. 47, No. 6, Jun. 1999.
GR-253-CORE by Telcordia Technologies, "Synchronous Optical Network (SONET) Transport Systems: Common Cireteria," Issue 3, Sep. 2000.
Hassan, "LPDC encoded pilots for iterative receiver improvement," pp. 1-30, Dec. 2005.
Hideki, et al., "A New Multilevel Coding Method Using Error-Correcting Codes," IEEE Transactions on Information Theory, vol. IT-23, No. 3, 1977.
Huaning Niu, et al., "Iterative Channel Estimation and LDPC Decoding Over Flat-Fading Channel: A Factor Graph Approach," 2003Conference on Information Sciences and Syetems, The Johns Hopkins University, Mar. 12-14, 2003.

Hu, et al., "Adaptive Modulation Using Long Range Prediction for Flat Rayleigh Fading Channels," Proceedings of the IEEE International Symposium on Information Theory, Sorrento, Italy, Jun. 25-30, 2000.
ITU Recommendation G.703, "General Aspects of Digital Transmission Systems—Terminal Equipments—Physical/Electrical Characteristics of Hierarchical Digital Interfaces," Geneva, Switzerland, 1991.
ITU Recommendation G.704, "Series G: Transmission Systems and Media, Digital Systems and Networks, Digital Transmission Systems—Terminal Equipments—General, Synchronous Frame Structures Used at 1544, 6312, 2048, 8448, and 44736 kbit/s Hierarchical Levels," Oct. 1998.
ITU Recommendation G.707/Y.1322, "Series G: Transmission Systems and Media, Digital Systems and Networks, Digital Terminal Equipments—general: Series Y: Global Information Infrastructure and Internet Protocol Aspects—Transport, Network Node Interface for the Synchonous Digital Hierarchy (SDH)," Oct. 2000.
ITU Recommendations G.783, "General Aspects of Digital Transmission Systems: Terminal Equipments—Characteristics of Synchronous Digital Hierarchy (SDH) Equipment Functional Blocks," Jan. 1994.
Jian Sun, "An Introduction to Low Density Parity Check (LDPC) Codes," West Virginia University, Jun. 3, 2003.
Johnson, et al., "Blind Equalization Using the Constant Modulus Criterion: A Review," Proceedings of the IEEE, vol. 86, No. 10, Oct. 1998.
Kim, et al., "Design of Carrier Recovery Algorithm for High-Order QAM with Large Frequency Acquisition Range," IEEE International Conference on Communication s (ICC), pp. 1016-1020, vol. 4, Helsinki, Finland, Jun. 11-14, 2001.
Kschischang, F., "Capacity Approaching Codes, Iterative Decoding Algorithms and Their Application: Coddes Defined on Graphs," IEEE Communications Magazine, pp. 118-125, Aug. 2003.
Lampe et al., "Misunderstandings about Link Adaptation for Frequency Selective Fading Channels," 13$^{th}$ IEEE Transactions on Vehicular Technology, vol. 2, pp. 710-714.
Lee, Dr. Lin-Nan, "LDPC Codes, Application to NextGeneration Communication Systems," Hughes Network System, Oct. 8, 2003.
Mielczarek & Svensson, "Phase offset estimation using enhanced turbo decoders," Proceedings of the IEEE International Conference on Communications, New York, New York, Apr. 28-May 2, 2002, vol. 3, pp. 1536-1540.
Mielczarek & Svensson, "Improving phase estimation with enhanced turbo decoders," PCC Workshop, Nynashamn, Sweden, 2001.
Nishimura et al., "Dynamic Rate Control for Mobile Multimedia Communication," Proceedings of the 1998 Communcations Society Conference of IEICE, Sep. 29-Oct. 2, 1998 (Abstract).
Pottie and Taylor, "Multilevel Codes Based on Partitionong," IEEE Transactions on Information Theory (35:1), Jan. 1989, pp. 87-98.
Richardson and Urbanke, "An Introduction to the Analysis of Iterative Coding Systems," Proceedings of the 1999 Institute for Mathematics and its Applications (IMA) Summer Program: Codes, Systems and Graphical Models, Minneapolis, Minnesota, Aug. 2-6, 1999.
Richardson, et al., "Capacity Approaching codes: Iterative Decoding Algorithms and Their Applications: Codes Defined on Graphs: The Renaissance of Gallager's Low-Density Parity Check Codes," IEEE Communications Magazine, pp. 126-131, Aug. 2003.
Riegel, M., "Requirements for edge-to-edge estimation of time division multiplexed (TDM) circuits over packet switcihhng networks," IETF Network Working Group, RFC 4197, Oct. 2005.
Ryan and Vasic, "Am Introduction to LDPC Codes," GlobeCom 2003, San Francisco, California, Dec. 5, 2003.
A. Saroka, et al., "Joint carrier phase estimation and turbo decoding using bit-carrier-phase APP decoder," 2004.
Worthen and Stark, "Unified Design of Iterative Receivers using Factor Graphs," IEEE Transactions on Information Theory, (47:2), Feb. 2001, pp. 843-849.
Xiaowei Jin, et al., "Analysis of Joint Channel Estimation and LDPC Decoding on Block Fading Channels," International Symposium on Information Theory and its Application, ISITA2004, Pharma, Italy, Oct. 10-13, 2004.

Office Action, mailed Sep. 30, 2010, for U.S. Appl. No. 11/973,464, filed Oct. 9, 2007, 13 pages.
Final Office Action, mailed Feb. 7, 2011, for U.S. Appl. No. 11/973,464, filed Oct. 9, 2007, 14 pages.

Notice of Allowance and Fee(s) Due, mailed Jun. 14, 2011, for U.S. Appl. No. 11/973,464, filed Oct. 9, 2007, 8 pages.

* cited by examiner

DECODING OF FORWARD ERROR CORRECTION CODES IN THE PRESENCE OF PHASE NOISE AND THERMAL NOISE

CROSS REFERENCE TO RELATED APPLICATIONS

This application is a continuation of U.S. application Ser. No. 11/973,464, filed Oct. 9, 2007, now allowed, which is incorporated herein by reference in its entirety.

FIELD OF THE INVENTION

Background of the Invention

Many communication systems use Forward Error Correction (FEC) codes to improve their performance in the presence of noise and distortion. Some block FEC codes are commonly decoded using iterative decoding processes. Iterative decoding methods are described, for example, by Worthen and Stark in "Unified Design of Iterative Receivers using Factor Graphs," IEEE Transactions on Information Theory, (47:2), February, 2001, pages 843-849, and by Richardson and Urbanke in "An Introduction to the Analysis of Iterative Coding Systems," Proceedings of the 1999 Institute for Mathematics and its Applications (IMA) Summer program: Codes, Systems and Graphical Models, Minneapolis, Minn., Aug. 2-6, 1999, which are incorporated herein by reference. Iterative FEC decoding processes often accept as input metrics of received bits and/or symbols. Some FEC metrics are bit-related, such as, for example, likelihood ratios (LRs) or log-likelihood ratios (LLRs) of individual bits in the received symbols.

Two families of codes that are commonly decoded using iterative processes are Low Density Parity Check (LDPC) codes and turbo codes. LDPC codes were first introduced by Gallager in "Low-Density Parity Check Codes," IRE Transactions on Information Theory, Volume 7, January, 1962, pages 21-28, which is incorporated herein by reference, and are also described by Ryan and Vasic in "An Introduction to LDPC Codes," GlobeCom 2003, San Francisco, Calif., Dec. 5, 2003, which is incorporated herein by reference.

In many Radio Frequency (RF) communication systems, the received signal is distorted by phase noise. Phase noise may be contributed, for example, by Local Oscillators (LOs) and other frequency and clock sources in the transmitter and/or receiver, by analog-to-digital and digital-to analog converters, as well as by other sources. Some communication receivers and reception methods, and in particular methods for decoding FEC codes, are designed for receiving signals in the presence of phase noise.

For example, U.S. Patent Application Publication 2006/0107179, whose disclosure is incorporated herein by reference, describes a method in which a magnitude metric of received signals is amplified during iterative decoding of LDPC code and LDPC coded modulation. The method selects a metric coefficient value that is used to calculate the initial conditions when decoding LDPC coded signals, depending on the particular Signal-to-Noise Ratio (SNR) at which the communication system is operating. By adjusting the metric coefficient value according to the given LDPC code, modulation, and noise variance, the convergence speed of the decoding process is slowed down so that the decoder will not converge to the wrong codeword. The range of the outputs of the decoder is restricted so that the output will not oscillate, and will eventually converge to the correct codeword.

Colavolpe et al. propose iterative decoding algorithms for channels affected by strong phase noise in "Algorithms for Iterative Decoding in the Presence of Strong Phase Noise," IEEE Journal on Selected Areas in Communications, (23:9), September, 2005, pages 1748-1757, which is incorporated herein by reference. The proposed algorithms apply the sum-product algorithm to the factor graph representing the joint a-posteriori probability mass function of the information bits, given the channel output. Problems caused by the presence of continuous random variables in the factor graph are addresses by applying canonical distributions. Two proposed algorithms are based on a Fourier series expansion of the phase probability density function, and on the Tikhonov canonical distribution.

SUMMARY OF THE INVENTION

Embodiments of the present invention provide a communication receiver, including:

a front end, which is arranged to receive a Radio Frequency (RF) signal, which includes modulated symbols carrying data that have been encoded by a block Forward Error Correction (FEC) code, and to convert the RF signal to a sequence of soft received symbols, wherein the soft received symbols are subject to distortion by at least first and second noise components having respective at least first and second statistical distributions;

a metric calculation unit, which is arranged to process the soft received symbols so as to extract parameters indicative of the at least first and second statistical distributions, and to compute FEC metrics based on the extracted parameters; and a FEC decoder, which is arranged to accept the FEC metrics as input, and to process the metrics in an iterative FEC decoding process so as to decode the FEC code and reconstruct the data.

In some embodiments, one of the first and second noise components includes thermal noise. Additionally or alternatively, one of the first and second noise components includes phase noise. The FEC code may include one of a Low Density Parity Check (LDPC) code, a turbo code and a Turbo Product Code (TPC).

In an embodiment, for a soft received symbol that is received responsively to a modulated symbol and for a target bit in a group of bits represented by the modulated symbol, the metric calculation unit is arranged to approximate a first probability that the target bit equals "1" given the soft received symbol, and a second probability that the target bit equals "0" given the soft received symbol, and to compute the FEC metrics based on the first and second probabilities. In a disclosed embodiment, the metric calculation unit is arranged to compute one of Log-Likelihood Ratios (LLRs) and Likelihood Ratios (LRs) based on the first and second probabilities.

In another embodiment, the modulated symbols are selected from a predetermined constellation of nominal symbols, and the metric calculation unit is arranged to compute the FEC metrics by comparing the soft received symbols to only two nominal symbols per each of the at least first and second noise components. In yet another embodiment, the soft received symbols and the nominal symbols are represented by respective coordinates in an In-phase/Quadrature (I/Q) plane, the at least first and second noise components have respective at least first and second distance metrics in the I/Q plane, and, for a soft received symbol that is received responsively to a modulated symbol and for a target bit in a group of bits represented by the modulated symbol, the two nominal symbols corresponding to a noise component include a first nominal symbol that is nearest to the soft received symbol in accordance with a respective distance metric of the noise component within a first subset including the nominal symbols whose target bit equals "0", and a second nominal symbol that is nearest to the soft received symbol in accordance with the respective distance metric of the noise component within a second subset including the nominal symbols whose target bit equals "1".

In still another embodiment, the first noise component includes thermal noise, the first distance metric includes Euclidean distance, the second noise component includes phase noise, and the second distance metric includes a Euclidean distance metric adjusted by a correction factor derived from the second statistical distribution.

The metric calculation unit may be arranged to compute the FEC metrics by multiplying a first function of the first statistical distribution by a second function of the second statistical distribution. The FEC metrics may depend on a timing of the soft received symbols. In an embodiment, the metric calculation unit is arranged to compute the FEC metrics by evaluating the metrics responsively to the first statistical distribution over a range of values of the second noise component assuming the second noise component is constant, weighting the evaluated metrics using a weighing function, and integrating the weighted metrics over the range of values of the second noise component. The weighting function may include a Probability Density Function (PDF) of the second noise component. In some embodiments, the metric calculation unit is arranged to compute the FEC metrics responsively to parameters of the reconstructed data that are fed back from the FEC decoder.

There is additionally provided, in accordance with an embodiment of the present invention, a communication receiver, including:

a front end, which is arranged to receive a Radio Frequency (RF) signal including modulated symbols, which carry data and are selected from a predetermined constellation of nominal symbols that correspond to respective decision regions in an In-phase/Quadrature (I/Q) plane, and to convert the RF signal to a sequence of soft received symbols, wherein the soft received symbols are subject to distortion by at least first and second noise components having respective at least first and second statistical distributions; and a slicer circuit, which is arranged to convert the soft received symbols to respective hard symbol decisions based on the decision regions in which the soft received symbols fall, to reconstruct the data from the hard symbol decisions, and to modify the decision regions in the I/Q plane responsively to the at least first and second statistical distributions.

In some embodiments, the constellation is divided into multiple cosets and each of the nominal symbols represents a respective group of bits, such that one or more of the bits in the group select a coset from among the cosets and the other bits select the nominal symbol within the selected coset, and the slicer circuit is arranged to separately modify the decision regions per each coset. In an embodiment, the slicer circuit is arranged to select a configuration of the decision regions from a predetermined set of configurations responsively to the at least first and second statistical distributions.

There is also provided, in accordance with an embodiment of the present invention, a method for communication, including:

receiving a Radio Frequency (RF) signal, which includes modulated symbols carrying data that have been encoded by a block Forward Error Correction (FEC) code;

converting the RF signal to a sequence of soft received symbols, wherein the soft received symbols are subject to distortion by at least first and second noise components having respective at least first and second statistical distributions;

processing the soft received symbols responsively to the at least first and second statistical distributions, so as to extract from the soft received symbols parameters that are indicative of the first and second statistical distributions;

computing FEC metrics based on the extracted parameters; and processing the FEC metrics in an iterative FEC decoding process that uses the FEC metrics as input, so as to decode the FEC code and reconstruct the data.

There is further provided, in accordance with an embodiment of the present invention, a method for communication, including:

receiving a Radio Frequency (RF) signal including modulated symbols, which carry data and are selected from a predetermined constellation of nominal symbols that correspond to respective decision regions in an In-phase/Quadrature (I/Q) plane;

converting the RF signal to a sequence of soft received symbols, wherein the soft received symbols are subject to distortion by at least first and second noise components having respective at least first and second statistical distributions;

converting the soft received symbols to respective hard symbol decisions based on the decision regions in which the soft received symbols fall, so as to reconstruct the data from the hard symbol decisions; and modifying the decision regions in the I/Q plane responsively to the at least first and second statistical distributions.

The present invention will be more fully understood from the following detailed description of the embodiments thereof, taken together with the drawings in which:

DETAILED DESCRIPTION OF EMBODIMENTS

Overview

Embodiments of the present invention that are described herein below provide improved methods and systems for decoding FEC codes in the presence of various types of noise. In some of these embodiments, a receiver receives a Radio Frequency (RF) signal comprising modulated symbols, which carry data that has been encoded by a block FEC code. The FEC code typically comprises a code that lends itself to iterative decoding, such as an LDPC code, a turbo code or a Turbo Product Code (TPC).

The receiver down-converts and digitizes the received signal, to produce soft received symbols. The soft received symbols may be corrupted by two or more different noise components, such as thermal noise and phase noise. Each noise component has a respective statistical distribution. The soft received symbols are processed by a metric calculation unit, whose output is fed to a FEC decoder. The metric calculation unit accepts the soft received symbols and computes FEC metrics to be used by the FEC decoder. The metric calculation unit computes the FEC metrics by extracting parameters that are indicative of the statistical distributions of the different noise components from the soft received symbols, and computing the metrics based on the extracted parameters.

The FEC decoder decodes the FEC code in an iterative decoding process using the FEC metrics, so as to recover the transmitted data bits. Since the FEC metrics are computed based on the actual noise distributions, the error performance of the decoding process is optimized per the specific noise statistics encountered by the receiver.

Several exemplary FEC metrics and metric calculation methods are described below. In some embodiments, the output of the FEC decoder is fed back to the metric calculation unit and used to adjust the FEC metrics in an iterative manner.

In some embodiments, some of the transmitted data bits are coded and other bits are left uncoded, such as using a multi-level coding scheme. Several methods for optimizing the demodulation of such schemes in the presence of different types of noise are described herein.

System Description

Figure 1:
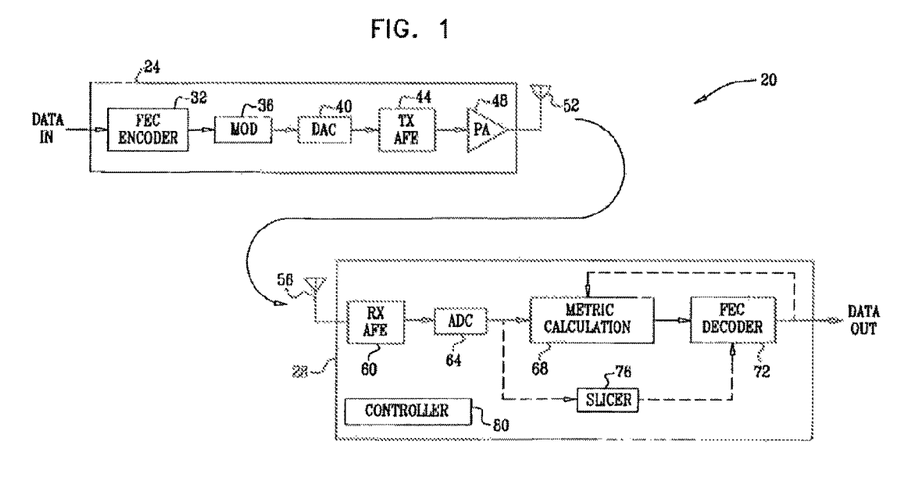
FIG. 1 is a block diagram that schematically illustrates a communication link, in accordance with an embodiment of the present invention.

FIG. 1 is a block diagram that schematically illustrates a communication link 20, in accordance with an embodiment of the present invention. Link 20 may comprise a microwave link, a millimeter wave link, or any other suitable link. Link 20 comprises a transmitter (TX) 24, which transmits data over a wireless channel to a receiver (RX) 28.

TX 24 comprises a Forward Error Correction (FEC) encoder 32, which encodes the input data using a FEC code. Typically, the code comprises a block code that lends itself to iterative decoding, such as an LDPC or turbo code. In some embodiments, the encoder uses a coding scheme that encodes only some of the data bits and leaves other bits uncoded.

The encoded data is modulated by a modulator 36. The modulator converts the data bits to a sequence of modulated symbols, in accordance with a certain modulation scheme, such as Binary Phase Shift Keying (BPSK), Quaternary Phase Shift Keying (QPSK), Quadrature Amplitude Modulation (QAM) or any other suitable modulation. In accordance with the modulation scheme used, modulator 36 maps bits, or groups of bits, to nominal symbols selected from a predetermined symbol constellation.

A Digital-to-Analog Converter (DAC) 40 converts the sequence of modulated symbols into an analog baseband signal. A Transmitter Analog Front End (TX AFE) 44 up-converts the baseband signal to a suitable Radio Frequency (RF), and performs functions such as filtering and power control. A Power Amplifier (PA) 48 amplifies the RF signal, and the signal is then transmitted via a transmit antenna 52 over the wireless channel.

The radio signal transmitted by transmitter 24 is received at receiver 28 by a receive antenna 56 and provided to a Receiver Analog Front End (RX AFE) 60. The RX AFE down-converts the received RF signal to a suitable intermediate frequency (IF) or to baseband, and usually performs functions such as filtering and analog gain control. The signal produced by the RX AFE is digitized by an Analog-to-Digital Converter (ADC) 64, which produces a sequence of soft received symbols.

Although FIG. 1 shows a single ADC, the receiver sometimes comprises two parallel ADCs that respectively produce In-phase and Quadrature (I/Q) samples. Each pair of I/Q samples corresponds to a soft received symbol. Each received symbol can be represented as a coordinate in a two-dimensional signal space spanned by the I and Q axes. The nominal symbols of the modulation scheme used by link 20 are represented by respective nominal signal points in the I/Q space. In the absence of noise, phase/frequency offset and other distortion, each soft received symbol theoretically falls on a nominal signal point that represents the symbol that was transmitted by the transmitter. In practical scenarios, however, the received symbols deviate from the nominal signal points due to noise and distortion.

RX 28 comprises a metric calculation unit 68 and a FEC decoder 72. The FEC decoder decodes the FEC code used by transmitter 24 in an iterative decoding process, using FEC metrics that are computed by unit 68. Any suitable iterative decoding process can be used for this purpose, such as the exemplary processes described in the above-cited references. Metric calculation unit 68 accepts the soft received symbols produced by ADC 64 and produces the FEC metrics that are used as input by the iterative decoding process carried out by FEC decoder 72.

In some embodiments, the FEC metrics comprise bit-related likelihood metrics, which estimate the likelihoods that a given coded bit in the corresponding transmitted symbol was "1" or "0". Exemplary FEC metrics are Likelihood Ratios (LRs) and Log-Likelihood Ratios (LLRs), as are known in the art. Alternatively, any other suitable FEC metric can also be used. FEC decoder 72 decodes the FEC using the metrics provided by unit 68 and produces a sequence of decoded bits, which reconstruct the data input to TX 24.

Figure 3:
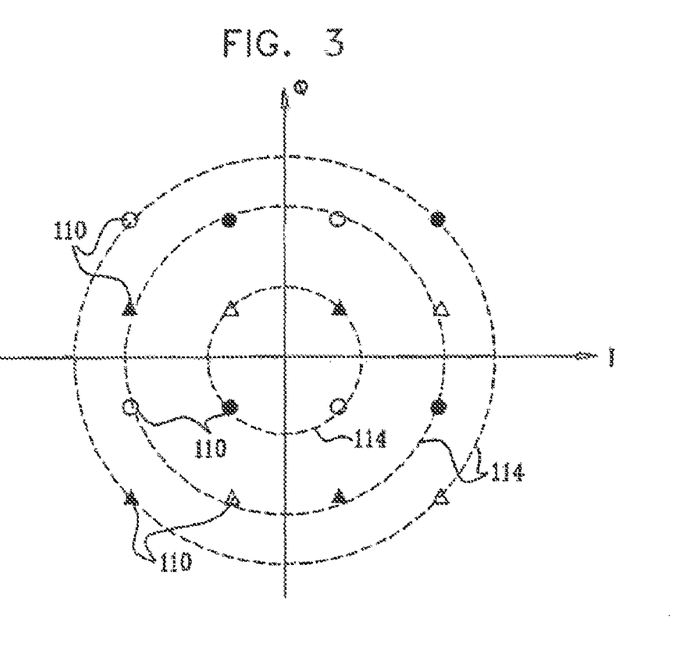
FIGS. 3, 4A and 4B are diagrams that schematically illustrate symbol constellations, in accordance with embodiments of the present invention.
Figure 4A:
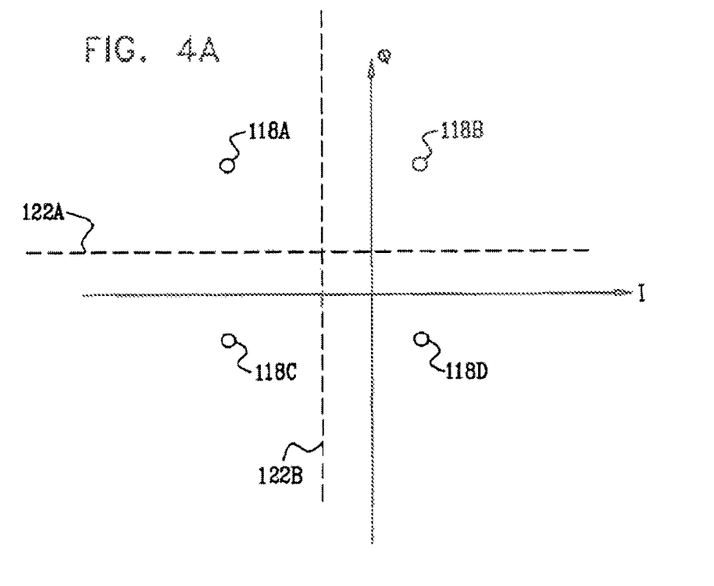
Figure 4B:
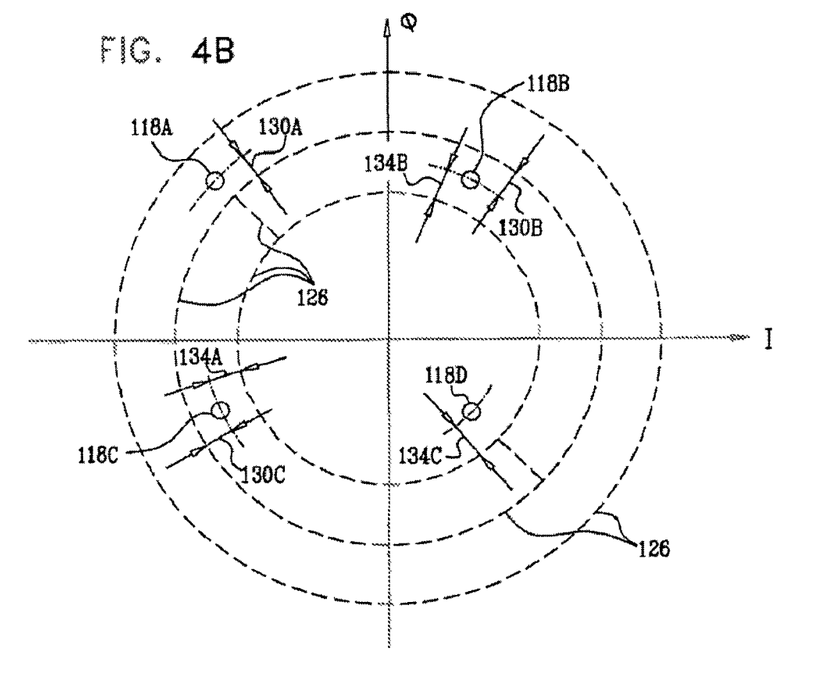

In some embodiments, RX 28 further comprises a slicer 76, which demodulates the sequence of soft received symbols to produce a sequence of hard symbol decisions. Typically, the slicer determines, for each received I/Q sample, which of the nominal constellation symbols is most likely to have been transmitted. The slicer produces the symbol decisions based on distances between the I/Q coordinates of the received symbols and the coordinates of the nominal constellation symbols. The slicer produces a sequence of bits, which reconstruct the sequence of encoded data bits produced by FEC encoder 32. In some embodiments, the slicer configuration is optimized with respect to the noise statistics present in the received signal. Several exemplary slicer configurations are shown in FIGS. 3, 4A and 4B below.

A controller 80 manages and controls the operation of RX 28. Typically, unit 68, FEC decoder 72 and slicer 76 are implemented in hardware, such as in one or more Application-Specific Integrated circuits (ASIC) or Field-Programmable Gate Arrays (FPGA). In some embodiments, some or all of the functions of metric calculation unit 68 are carried out in software, for example using controller 80.

FEC Metrics Based on Thermal and Phase Noise

As noted above, the soft received symbols may be distorted by different noise components, such as thermal noise or phase noise. The different noise components generally have different properties and different statistical distributions. Thermal noise, for example, is typically modeled as an Additive White Gaussian Noise (AWGN) process. Phase noise is usually a multiplicative noise, whose spectral density decays rapidly as a function of distance from the carrier frequency.

Other types of noise may comprise Inter-Symbol Interference (ISI) and various other types of distortion caused by the transmitter, receiver or communication channel. In the context of the present patent application and in the claims, all of these types of distortion are referred to herein as "noise components."

In the description that follows, the received symbols are assumed to be distorted by both thermal noise and phase noise. The thermal noise is assumed to be Gaussian and white, with a spectral density denoted $N_0$. The phase noise (typically, the residual phase noise after carrier recovery processing) is assumed to be Gaussian with a variance denoted $\sigma_\theta^2$. In some embodiments, metric calculation unit 68 computes bit-related LLR metrics based on the distributions of the thermal noise and phase noise components that affect the received symbols. Since the FEC metrics are optimized per the specific noise statistics encountered by the receiver, the error performance of the decoding process is improved.

The LLR of a particular received bit c is defined as $$LLR = \log \frac{Pr(c=0/y)}{Pr(c=1/y)} \quad [1]$$

wherein y denotes the soft received symbol. Thus, the LLR is defined as the log ratio between the probability that, given the received symbol y, the received bit c should be decoded as "0" and the probability that bit c should be decoded as "1".

Assuming that "0" and "1" bit values occur at equal probabilities, Equation [1] above can be written as $$LLR = \log \frac{Pr(y/c=0)}{Pr(y/c=1)} \quad [2]$$

When only thermal noise is present, Equation [2] above can be written as $$LLR = \log \left[ \sum_{s_i \in S^0} e^{-\frac{|y-s_i|^2}{N_0}} \right] - \log \left[ \sum_{s_i \in S^1} e^{-\frac{|y-s_i|^2}{N_0}} \right] \quad [3]$$

wherein $S_i$ indexes the nominal constellation symbols, $S^0$ denotes a subset of the nominal constellation symbols in which the decoded bit c equals "0", and $S^1$ denotes the subset of the nominal constellation symbols in which bit c equals "1". Equation [3] above can be approximated by $$LLR \approx \frac{1}{N_0} \left( \min_{s_i \in S^1} |y-s_i|^2 - \min_{s_i \in S^0} |y-s_i|^2 \right) \quad [4]$$

Equation [4] shows that for thermal noise the LLR can be approximated by calculating the Euclidean distances between the received symbol y and the nearest nominal constellation symbol in each of subsets $S^0$ and $S^1$, Equations [3] and [4] above can also be used to approximate the LLR values when phase noise is present, but is negligible with respect to the thermal noise.

When the received signal is also affected by phase noise, the LLR can be written as $$LLR = \log \left( \frac{\sum_{S_0} Pr(y/S_0) \cdot Pr(S_0)}{\sum_{S_1} Pr(y/S_1) \cdot Pr(S_1)} \right) =$$

$$\log \left( \frac{\sum_{S_0} Pr(y/S_0)}{\sum_{S_1} Pr(y/S_1)} \right) = \log \left( \frac{\sum_{S_0} E_\theta[Pr(y/S_0, \theta)]}{\sum_{S_1} E_\theta[Pr(y/S_1, \theta)]} \right) \quad [5]$$

wherein θ is a random variable representing the phase error. Equation [5] applies not only to phase noise, but to any other random variable that affects the received signal, such as other types of noise and distortion components.

Using the principle of Equation [5] above, Equation [4] above can be generalized for cases in which the received signal is affected by both thermal noise and phase noise. It can be shown that in these cases, the LLR can be approximated by considering only four of the nominal constellation symbols:

The two nearest constellation symbols assuming only thermal noise is present (i.e., the constellation symbol having the smallest Euclidean distance to the received symbol in each of subsets $S^0$ and $S^1$). These two constellation symbols are denoted A∞ and B∞, respectively.

The two nearest constellation symbols, selected with a modified Euclidean distance metric, which is adjusted by a correction factor to account for the phase noise. The calculation of the distance metric assumes that phase noise is dominant. These two constellation symbols are denoted $A_0$ and $B_0$, respectively.

The four constellation symbols $A_0$, $B_0$, $A_\infty$ and $B_\infty$ are given by $$A_0 \equiv \mathrm{argmax}_{S_0} \left\{ \frac{(|y| \cdot |S_0| \cdot \sin(\varphi_0))^2}{|y| \cdot |S_0|} - |y-S_0|^2 \right\} \quad [6]$$

$$B_0 \equiv \mathrm{argmax}_{S_1} \left\{ \frac{(|y| \cdot |S_1| \cdot \sin(\varphi_1))^2}{|y| \cdot |S_1|} - |y-S_1|^2 \right\}$$

$$A_\infty \equiv \mathrm{argmax}_{S_0} \{-|y-S_0|^2\}$$

$$B_\infty \equiv \mathrm{argmax}_{S_1} \{-|y-S_1|^2\}$$

wherein arg max $S_0\{\ \}$ denotes the member of set $S_0$ that maximizes the bracketed expression, and $\phi_0$, $\phi_1$ denote the angular differences between the received soft symbol and the constellation symbol being evaluated.

It can be shown that the LLR can be approximated using these four constellation symbols as $$LLR \approx \frac{1}{N_0} \max \left\{ \begin{array}{l} \frac{(|y| \cdot |A_0| \cdot \sin(\varphi_{A_0}))^2}{|y| \cdot |A_0| + \frac{N_0}{2 \cdot \sigma_\theta^2}} - |y-A_0|^2, \\ \frac{(|y| \cdot |A_\infty| \cdot \sin(\varphi_{A_\infty}))^2}{|y| \cdot |A_\infty| + \frac{N_0}{2 \cdot \sigma_\theta^2}} - |y-A_\infty|^2 \end{array} \right\} - \quad [7]$$

$$\frac{1}{N_0} \max \left\{ \begin{array}{l} \frac{(|y| \cdot |B_0| \cdot \sin(\varphi_{B_0}))^2}{|y| \cdot |B_0| + \frac{N_0}{2 \cdot \sigma_\theta^2}} - |y-B_0|^2, \\ \frac{(|y| \cdot |B_\infty| \cdot \sin(\varphi_{B_\infty}))^2}{|y| \cdot |B_\infty| + \frac{N_0}{2 \cdot \sigma_\theta^2}} - |y-B_\infty|^2 \end{array} \right\}$$

Metric calculation unit 68 computes the FEC metrics using Equations [6] and [7] above. Note that in order to compute the FEC metrics, unit 68 does not necessarily select the four nearest constellation symbols defined in Equation [6] above in an explicit manner. For example, unit 68 may evaluate Equation [7] above for all constellation symbols, without explicitly identifying or selecting the nearest symbols.

Although Equations [6] and [7] above refer to thermal noise and phase noise, the principles of the method described herein can be used to approximate the LLR for signals that are distorted by other types of noise. Each noise type (noise component) is characterized by an appropriate distance metric, e.g., Euclidean distance for thermal noise, and a modified Euclidean distance, as described above, for phase noise.

When the received signal is corrupted by two separate noise components having two separate statistical distributions, the LLR of a certain bit can be approximated by calculating the distances from the received symbol to four nominal constellation symbols: The two nearest constellation symbols selected using a first distance metric that depends on the first statistical distribution, and the two nearest constellation symbols selected using a second distance metric that depends on the second statistical distribution. Thus, each distance calculation is performed using a distance metric that suits the noise type in question.

Generally, when the received signal is corrupted by N separate noise components having respective N statistical distributions, the LLR can be approximated by calculating the distances from the received symbol to 2 N nominal constellation symbols. For each noise component, two constellation symbols are selected using a distance metric that depends on the respective statistical distribution of the noise component.

Although the description above refers to the calculation of LLRs, the principles of the method can be used, mutatis mutandis, to calculate other types of FEC metrics, as well.

Note that in some cases, a certain constellation symbol may have the smallest distance to the received symbol using two different distance metrics. For example, in some cases, when determining the nearest constellation symbols using Equation [6] above, symbol $A_0$ may be the same constellation symbol as $B_0$. In these cases, the actual number of constellation symbols considered may be smaller than four.

Further alternatively, the FEC metrics can be calculated using any other suitable method, which extracts parameters that are indicative of the statistical distributions of the different noise components and computes the metrics based on the extracted parameters.

FEC Code Decoding Methods

Figure 2:
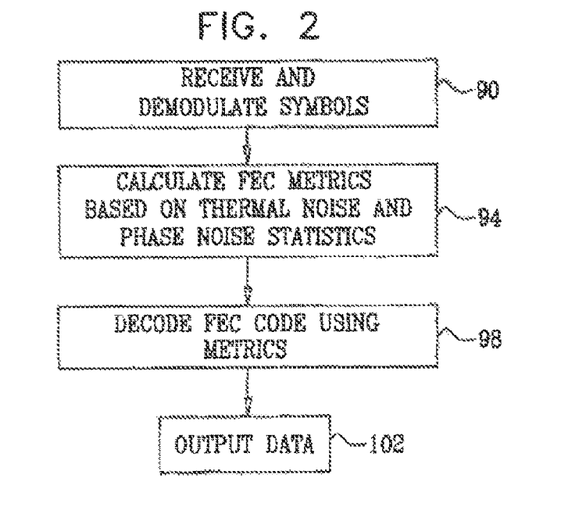
FIG. 2 is a flow chart that schematically illustrates a method for decoding Forward Error Correction (FEC) codes in the presence of thermal noise and phase noise, in accordance with an embodiment of the present invention.

FIG. 2 is a flow chart that schematically illustrates a method for decoding FEC codes in the presence of thermal noise and phase noise, in accordance with an embodiment of the present invention. The method begins with RX 28 receiving the RF signal transmitted from TX 24, at a reception step 90. The signal is assumed to comprise modulated symbols, which carry data that has been encoded using an iterative block FEC code, such as an LDPC or turbo code. RX AFE 60 down-converts the RF signal to baseband. ADC 64 digitizes the baseband signal and provides the soft received symbols to metric calculation unit 68.

The soft received symbols are affected by phase noise, as well as by thermal noise. Unit 68 computes estimated LLR values of the received bits, taking into account the statistical properties of the two noise distributions, at a metric computation step 94. In some embodiments, unit 68 calculates LLRs of the received bits in accordance with Equations [6] and [7] above. FEC decoder 72 decodes the FEC code using the FEC metrics, at a decoding step 98. The decoded data is then output by the receiver, at an output step 102.

In some embodiments, the receiver comprises a carrier recovery loop, which estimates the transmitter carrier phase based on measurements performed on the received signal. In these embodiments, the phase noise that affects the UR calculation of Equation [6] and [7] above is the residual phase noise, after the receiver has corrected the phase errors to the best of its ability using the carrier recovery loop. This residual phase noise may be caused by variations in phase noise over time, or by the limited accuracy and residual errors of the carrier recovery loop.

Alternatively to using Equations [6] and [7] above, metric calculation unit 68 can sometimes compute an FEC metric having the form Metric=Metric(ThermalNoise)·c(PhaseNoise). In other words, unit 68 can evaluate an ECC metric assuming only thermal noise, and multiply it by scaling factor that is a function of the phase noise. In some embodiments, the scaling factor can depend on the symbol timing. For example, when a carrier recovery loop is used, the residual phase noise may be small in some symbols (e.g., symbols in which the loop performs phase corrections) and larger for other symbols. Unit 68 can account for these differences by scaling the FEC metric accordingly.

in another alternative embodiment, unit 68 computes the joint thermal/phase noise metric by calculating the metric for thermal noise, assuming the current phase noise is fixed at a value of $\theta$. This metric is denoted $\text{Metric}_\theta$. Then, unit 68 integrates $\text{Metric}_\theta$ over the range of possible values of $\theta$, and weighs the integration by $f(\theta)$, the probability density function (PDF) of $\theta$. The FEC metric is thus given by $$\text{Metric} = \int_\theta f(\theta) \cdot \text{Metric}_\theta d\theta \qquad [8]$$

Alternatively to weighting the integration by the PDF of $\theta$, unit 68 may use other weighting functions, such as various estimates or approximations of the PDF.

In some embodiments, parameters of the reconstructed data are fed back from the output of FEC decoder 72 to metric calculation unit 68 and used in the metric calculation process. In these embodiments, the LLR calculation process is iterative, and uses the feedback from the i'th decoded codeword in the (i−1)'th iteration. Unit 68 may thus calculate an FIR having the form $\text{LLR}_{i+1} = \text{LLR}_i + \text{Correction (feedback)}$.

For example, the decoder output can provide information regarding the actual bit probabilities, i.e., $\Pr(c=0)$ and $\Pr(c=1)$ at each iteration. As noted above, the LLR is given by $$LLR = \log \frac{Pr(c=0/y)}{Pr(c=1/y)} = \log \frac{Pr(y/c=0) \cdot Pr(c=0)}{Pr(y/c=1) \cdot Pr(c=1)} \qquad [9]$$

In the first iteration, the LLR is calculated by $$LLR = \log \frac{Pr(y/c=0) \cdot Pr(c=0)}{Pr(y/c=1) \cdot Pr(c=1)} = \log \frac{Pr(y/c=0)}{Pr(y/c=1)} \qquad [10]$$

In subsequent iterations, however, the factor $\Pr(c=0)/\Pr(c=1)$ in Equation [9] above can be updated based on the actual probabilities at the FEC decoder output.

Multilevel FEC Code Decoding Based on Phase Noise Statistics

In some embodiments, only some of the data bits are encoded at the transmitter using the FEC code, and other bits are left uncoded. For example, the data may be encoded using a coset coding scheme, in a process that is also referred to as multilevel encoding. Techniques that use combinations of coded and uncoded bits and other multilevel coding methods are described, for example, in U.S. Patent Application Publication 2005/0010853 A1, whose disclosure is incorporated herein by reference. Coset codes are also described by Pottie and Taylor in "Multilevel Codes Based on Partitioning," IEEE Transactions on Information Theory (35:1), January, 1989, pages 87-98, which is incorporated herein by reference.

In such coding schemes, the nominal symbol constellation is partitioned into several subsets of symbols, referred to as cosets. When encoding or decoding a certain symbol, the coded bits select the coset to be used, and the uncoded bits select a specific constellation symbol within the selected coset.

FIG. 3 is a diagram that schematically illustrates an exemplary symbol constellation partitioned into cosets, in accordance with an embodiment of the present invention. The exemplary constellation shown in FIG. 3 is a 16-QAM constellation, which comprises sixteen constellation symbols 110. The symbols lie on a regular square grid in the I/Q plane, as well as on three concentric circles 114 centered at the origin.

Constellation symbols 110 are partitioned into four cosets, with four symbols in each coset. The different cosets are marked with different icons in the figure. Typically, the partitioning attempts to maximize the distances between symbols within each coset. In the present example, each transmitted symbol represents four bits. Two bits of each symbol are encoded, and indicate which coset is to be used for decoding. The other two bits are left uncoded, and indicate the specific symbol within the selected coset.

The intra-coset demodulation process, i.e., the process of determining which of the nominal constellation symbols within a certain coset is most likely to have been transmitted given a certain soft received symbol, is typically carried out by slicer 76. Typically, the slicer divides the I/Q plane into regions, referred to as decision regions, that surround the nominal constellation symbols. The lines that divide the I/Q plane into the decision regions are referred to as decision lines. When a soft received symbol falls in the decision region of a particular constellation symbol, the demodulator assumed that this constellation symbol was transmitted.

In some embodiments, slicer 76 can set the geometrical properties of the decision regions based on the statistical distribution of the different noise processes that affect the signals.

FIGS. 4A and 4B are diagrams that schematically illustrate a coset with decision regions, in accordance with embodiments of the present invention. The figures show four symbols 118A . . . 118D, which belong to one of the four cosets shown in FIG. 3 above. The assumption is that the two coded bits have already been decoded (e.g., using the method of FIG. 2 above), so that the appropriate coset has been selected. At this stage, the demodulator has the task of selecting one of the symbols within the selected coset.

FIGS. 4A and 4B demonstrate two different divisions of the I/Q plane into decision regions. The decision regions shown in FIG. 4A are particularly suited to scenarios in which the thermal noise is dominant, while the decision regions shown in FIG. 4A are advantageous when phase noise dominates.

In FIG. 4A, the I/Q plane is divided into four decision regions by two orthogonal decision lines 122A and 12213. The decision lines are positioned at equal Euclidean distances from symbols 118A . . . 118D. (Line 122A is positioned mid-way between symbols 118A and 118C, and between symbols 118B and 118D. Similarly, line 122B is positioned mid-way between symbols 118A and 118B, and between symbols 118C and 118D.) Since thermal noise is assumed to have a two-dimensional Gaussian distribution, the division shown in FIG. 4A is best-suited for scenarios in which thermal noise is strong with respect to phase noise.

In FIG. 4B, the decision regions are optimized for dominant phase noise. When phase noise is dominant, the majority of the distortion is caused to the phase of the signal. Thus, the deviation of the soft received symbols from the nominal constellation points are primarily angular, along an arc having the radius of the constellation point with respect to the origin of the I/Q plane. Magnitude deviations, i.e., radial deviations, are usually small.

Using this property of phase noise distortion, the I/Q plane in the example of FIG. 4B is divided by decision lines 126, which comprise three concentric circles and two straight diagonal sections. The radii of the circles are selected so that the radial distances from a particular circle to the nearest symbols on either side of the circle are equal.

Consider, for example, the innermost circle. Symbol 118D is located inside this circle and its radial distance from the circle is denoted 134C. Symbols 118B and 118C are located on the outside of this circle, and their radial distances to the circle are denoted 134B and 134A, respectively. The radius of the innermost circle is chosen so that radial distances 134A, 134B and 134C are equal to one another.

Similarly, considering the middle circle, symbol 118A is located on the outside of the circle and its radial distance to the circle is denoted 130A. Symbols 118B and 118C are located on the inside of this circle, and their radial distances to the circle are denoted 130B and 130C, respectively. The radius of the middle circle is chosen so that three radial distances 130A . . . 130C are equal to one another. The middle ring, between the innermost and middle circles, is divided into two decision regions by two straight diagonal sections, located symmetrically between symbols 118B and 118C.

The decision region configuration of FIG. 4B makes use of the fact that, when phase noise is dominant, angular errors may be large but radial errors are usually small. Using this configuration, even when the soft received symbols have very large phase errors, they are likely to remain within the correct decision region. Note that the decision regions are not symmetric with respect to the I/Q origin, since the coset itself is positioned asymmetrically.

FIGS. 4A and 4B above show configurations that are best-suited for extreme scenarios of dominant thermal noise and dominant phase noise, respectively. In some cases, however, the different noise components are of similar or comparable magnitudes. In these cases, different configurations of decision regions, which balance the contribution of each noise component, can be used.

In some embodiments, slicer 76 can modify the division of the I/Q plane into decision regions in an adaptive manner, based on the current estimated noise statistics. For example, the slicer can hold two or more predetermined decision zone configurations, and switch from one configuration to another based on the estimated noise statistics. In some cases, controller 80 makes the decisions to switch between slicer configurations, selects the appropriate slicer configuration and controls slicer 76 accordingly.

Although the embodiments described herein mainly address wireless communication links, the principles of the present invention can also be used in other types of links that use radio frequencies, such as RF cable links.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

What is claimed is:

1. A communication transceiver unit, comprising:
a front end assembly configured to receive a Radio Frequency (RF) signal, and to process the RF signal to produce a sequence of soft received symbols,
wherein the soft received symbols are subject to distortion by at least first and second noise components each having respective at least first and second statistical distributions, and
wherein the RF signal includes a plurality of modulated symbols carrying data that has been encoded by a block Forward Error Correction (FEC) code;
a metric calculation unit configured to compute a plurality of FEC metrics using a combination of a first function of the first statistical distribution and a second function of the second statistical distribution; and
a FEC decoder assembly configured to accept the plurality of FEC metrics as input, and to process the FEC metrics in an iterative FEC decoding process so as to decode the FEC code and reconstruct the data.

2. The transceiver unit according to claim 1, wherein one of the first and second noise components includes thermal noise, and another of the first and second noise components includes phase noise.

3. The transceiver unit according to claim 1, wherein the FEC code includes one of a Low Density Parity Check (LDPC) code, a turbo code and a Turbo Product Code (TPC).

4. The transceiver unit according to claim 1, wherein, for a soft received symbol that is received responsively to a modulated symbol and for a target bit in a group of bits represented by the modulated symbol, the metric calculation unit is arranged to approximate a first probability that the target bit equals "1" given the soft received symbol, and a second probability that the target bit equals "0" given the soft received symbol, and to compute the FEC metrics based on the first and second probabilities.

5. The transceiver unit according to claim 4, wherein the metric calculation unit is configured to compute one of Log-Likelihood Ratios (LLRs) and Likelihood Ratios (LRs) based on the first and second probabilities, wherein the LRs and the LRs define the log ratio between a probability that, given the soft received symbol, the target bit should be decoded as "0" and a probability that the target bit should be decoded as "1".

6. The transceiver unit according to claim 1, wherein the modulated symbols are selected from a predetermined constellation of nominal symbols, and wherein the metric calculation unit is arranged to compute the FEC metrics by comparing the soft received symbols to only two nominal symbols per each of the at least first and second noise components,
wherein the two nominal symbols per the first noise component are two nearest nominal symbols when only thermal noise is present, and
wherein the two nominal symbols per the second noise component are two nearest nominal symbols when only phase noise is present.

7. The transceiver unit according to claim 6, wherein the soft received symbols and the nominal symbols are represented by respective coordinates in an In-phase/Quadrature (I/Q) plane, wherein the at least first and second noise components have respective at least first and second distance metrics in the I/Q plane, and wherein, for a soft received symbol that is received responsively to a modulated symbol and for a target bit in a group of bits represented by the modulated symbol, the two nominal symbols corresponding to a noise component comprise a first nominal symbol that is nearest to the soft received symbol in accordance with a respective distance metric of the noise component within a first subset comprising the nominal symbols whose target bit equals "0", and a second nominal symbol that is nearest to the soft received symbol in accordance with the respective distance metric of the noise component within a second subset comprising the nominal symbols whose target bit equals "1".

8. The transceiver unit according to claim 7, wherein the first noise component comprises thermal noise, wherein the first distance metric comprises Euclidean distance, wherein the second noise component comprises phase noise, and wherein the second distance metric comprises a Euclidean distance metric adjusted by a correction factor derived from the second statistical distribution.

9. The transceiver unit according to claim 1, wherein the FEC metrics are computed using a scaling factor, and wherein the scaling factor depends on a timing of the soft received symbols.

10. The transceiver unit according to claim 1, wherein the 1 metric calculation unit is arranged to compute the FEC metrics by evaluating the metrics responsively to the first statistical distribution over a range of values of the second noise component assuming the second noise component is constant, weighting the evaluated metrics using a weighing function, and integrating the weighted metrics over the range of values of the second noise component.

11. The transceiver unit according to claim 10, wherein the weighting function comprises a Probability Density 1 Function (PDF) of the second noise component.

12. The transceiver unit according to claim 1, wherein the metric calculation unit is arranged to compute the FEC metrics responsively to parameters of the reconstructed data that are fed back from the FEC decoder.

13. The transceiver unit according to claim 1, further comprising a carrier recovery loop configured to estimate a transmitter carrier phase based on measurements performed on the RF signal.

14. A communication transceiver unit, comprising:
a front end assembly configured to receive a Radio Frequency (RF) signal that includes a plurality of modulated symbols, and to process the RF signal to produce a sequence of soft received symbols,
wherein the plurality of modulated symbols carry data and are selected from a predetermined constellation of nominal symbols that correspond to respective decision regions in an In-phase/Quadrature (I/Q) plane, and
wherein the soft received symbols are subject to distortion by at least first and second noise components having respective at least first and second statistical distributions;
a slicer circuit configured to convert the soft received symbols to respective hard symbol decisions based on the decision regions in which the soft received symbols fall, to reconstruct the data from the hard symbol decisions, to modify the decision regions in the I/Q plane responsively to the at least first and second statistical distributions, to hold at least a first and a second predetermined decision zone configuration, and to switch from the first configuration to the second configuration based on current estimated noise statistics; and
a controller module configured to control the front end assembly, and to determine when to switch between the first configuration and the second configuration.

15. The transceiver unit according to claim 14, wherein the constellation is divided into multiple cosets and wherein each of the nominal symbols represents a respective group of bits, such that one or more of the bits in the group select a coset from among the cosets and the other bits select the nominal symbol within the selected coset, and wherein the slicer circuit is arranged to separately modify the decision regions per each coset.

16. The transceiver unit according to claim 15, wherein the slicer circuit is arranged to select a configuration of the decision regions from a predetermined set of configurations responsively to the at least first and second statistical distributions.

17. The transceiver unit according to claim 14, wherein the modulated symbols are converted using at least one of a Binary Phase Shift Keying (BPSK), Quaternary Phase Shift Keying (QPSK), and Quadrature Amplitude Modulation (QAM).

18. The transceiver unit according to claim 14, further comprising at least two parallel Analog-to-Digital Converters (ADCs) that respectively produce In-phase/Quadrature (I/Q) samples, wherein each pair of I/Q samples corresponds to one of the soft received symbols.

19. The transceiver unit according to claim 14, wherein the slicer circuit modifies the decision regions in the I/Q plane in an adaptive manner based on the estimated noise statistics.

20. A method for communication, comprising:
receiving a Radio Frequency (RF) signal that includes a plurality of modulated symbols carrying data that has been encoded by a block Forward Error Correction (FEC) code;
converting the RF signal to a sequence of soft received symbols, wherein the soft received symbols are subject to distortion by at least first and second noise components having respective at least first and second statistical distributions;
processing the soft received symbols responsively to the at least first and second statistical distributions, so as to extract from the soft received symbols parameters that are indicative of the first and second statistical distributions;
computing FEC metrics based on the extracted parameters, wherein the processing the soft received symbols comprises evaluating the FEC metrics responsively to the first statistical distribution over a range of values of the second noise component assuming the second statistical distribution is constant, weighting the evaluated FEC metrics using a weight function, and integrating the weighted FEC metrics over the range of values of the second noise component; and
processing the FEC metrics in an iterative FEC decoding process that uses the FEC metrics as input, so as to decode the FEC code and reconstruct the data.

21. The method according to claim 20, wherein, for a soft received symbol that is received responsively to a modulated symbol and for a target bit in a group of bits represented by the modulated symbol, processing the soft received symbols comprises approximating a first probability that the target bit equals "1" given the soft received symbol, and a second probability that the target bit equals "0" given the soft received symbol, and computing the FEC metrics based on the first and second probabilities.

22. The method according to claim 20, wherein the modulated symbols are selected from a predetermined constellation of nominal symbols, and wherein computing the FEC metrics comprises comparing the soft received; symbols to only two nominal symbols per each of the at least first and second noise components.

23. The method according to claim 22, wherein the soft received symbols and the nominal symbols are represented by respective coordinates in an In-phase/Quadrature (I/Q) plane, wherein the at least first and second noise components have respective at least first and second distance metrics in the I/Q plane, and wherein, for a soft received symbol that is received responsively to a modulated symbol and for a target bit in a group of bits represented by the modulated symbol, the two nominal symbols corresponding to a noise component comprise a first nominal symbol that is nearest to the soft received symbol in accordance with a respective distance metric of the noise component within a first subset comprising the nominal symbols whose target bit equals "0", and a second nominal symbol that is nearest to the soft received symbol in accordance with the respective distance metric of the noise component within a second subset comprising the nominal symbols whose target bit equals "1".

24. The method according to claim 20, wherein processing the soft received symbols comprises computing the FEC metrics by multiplying a first function of the first statistical distribution by a second function of the second statistical distribution.

25. The method according to claim 20, wherein processing the soft received symbols comprises computing the FEC metrics responsively to parameters of the reconstructed data that are fed back from an output of the iterative decoding process.

26. A method for communication, comprising:
receiving a Radio Frequency (RF) signal including a plurality of modulated symbols, which carry data and are selected from a predetermined constellation of nominal symbols that correspond to respective decision regions in an In-phase/Quadrature (I/Q) plane;
converting the RF signal to a sequence of soft received symbols, wherein the soft received symbols are subject to distortion by at least first and second noise components having respective at least first and second statistical distributions;
converting the soft received symbols to respective hard symbol decisions based on the decision regions in which the soft received symbols fall, so as to reconstruct the data from the hard symbol decisions;
modifying the decision regions in the I/Q plane responsively to the at least first and second statistical distributions;
storing at least a first and a second predetermined decision zone configuration; and
determining, by a controller module, when to switch between the first configuration and the second configuration.

27. The method according to claim 26, wherein the first and second predetermined decision zone configurations are stored by a slicer circuit.

28. The method according to claim 27, further comprising switching, by the slicer circuit, from the first configuration to the second configuration based on current estimated noise statistics.

* * * * *

UNITED STATES PATENT AND TRADEMARK OFFICE
CERTIFICATE OF CORRECTION

PATENT NO. : 8,351,552 B2
APPLICATION NO. : 13/274742
DATED : January 8, 2013
INVENTOR(S) : Montekyo et al.

Page 1 of 1

It is certified that error appears in the above-identified patent and that said Letters Patent is hereby corrected as shown below:

Column 13, Line 42, please replace "LRs and" with --LLRs and--.

Column 15, Line 61, please replace ".a" with --a--.

Column 16, Line 2, please replace "received;" with --received--.

Signed and Sealed this
Twenty-sixth Day of February, 2013

Teresa Stanek Rea
*Acting Director of the United States Patent and Trademark Office*